(12) United States Patent
Sakakibara et al.

(10) Patent No.: US 7,030,590 B2
(45) Date of Patent: Apr. 18, 2006

(54) APPARATUS FOR REFRESHING BATTERIES

(75) Inventors: Kazuyuki Sakakibara, Anjo (JP);
Tomoo Muramatsu, Anjo (JP);
Hisakazu Okabayashi, Anjo (JP)

(73) Assignee: Makita Corporation, Anio (JP)

( * ) Notice: Subject to any disclaimer, the term of this patent is extended or adjusted under 35 U.S.C. 154(b) by 0 days.

(21) Appl. No.: 10/395,432

(22) Filed: Mar. 24, 2003

(65) Prior Publication Data
US 2003/0178968 A1 Sep. 25, 2003

(30) Foreign Application Priority Data
Mar. 25, 2002 (JP) ............... 2002-084382

(51) Int. Cl.
*H02J 7/00* (2006.01)
(52) U.S. Cl. ..................... 320/112; 320/128
(58) Field of Classification Search ............... 320/112, 320/106, 107, 110, 128, 132–136, 150, 155–158

See application file for complete search history.

(56) References Cited

U.S. PATENT DOCUMENTS

| 5,187,425 | A | * | 2/1993 | Tanikawa | .................. | 320/138 |
| 5,325,039 | A | * | 6/1994 | Ninomiya | ................... | 320/157 |
| 5,942,878 | A | | 8/1999 | Ito | ............. | 320/131 |
| 6,191,554 | B1 | * | 2/2001 | Nakane et al. | ............. | 320/114 |
| 6,577,104 | B1 | * | 6/2003 | Sakakibara | .................. | 320/132 |
| 2002/0149346 | A1 | * | 10/2002 | Sakakibara | ................ | 320/162 |

FOREIGN PATENT DOCUMENTS

| JP | 4-347542 | 12/1992 |
| JP | 5-166541 | 7/1993 |
| JP | 5-260672 | 10/1993 |
| JP | 5-328624 | 12/1993 |
| JP | 6-105475 | 4/1994 |
| JP | 6-269131 | 9/1994 |
| JP | 7-105982 | 4/1995 |
| JP | 7-143680 | 6/1995 |
| JP | 7-177666 | 7/1995 |
| JP | 7-288935 | 10/1995 |
| JP | 7-307168 | 11/1995 |
| JP | 7-308029 | 11/1995 |
| JP | 8-55640 | 2/1996 |
| JP | 8-223812 | 8/1996 |
| JP | 10-050355 | 2/1998 |

(Continued)

*Primary Examiner*—Pia Tibbits
(74) *Attorney, Agent, or Firm*—Orrick Herrington & Sutcliffe, LLP

(57) ABSTRACT

Battery charger (10) may include a power source circuit (22) for charging rechargeable batteries (58) when a battery pack (50) is connected directly to the battery charger or is connected thereto with an adapter (30) interposed therebetween. The adapter may include a discharging circuit (42) for discharging the rechargeable batteries. The adapter may also include a switch (48) for alternatively connecting the rechargeable batteries with the discharging circuit or the charging circuit of the battery charger. The battery pack may have a memory (61) storing a flag indicating whether a refresh process is required. The adapter may further include a control portion (41) for controlling the switch. When the battery pack has been connected to the battery charger via the adapter, the control portion may preferably controls the switch on the basis of the flag stored in the memory of the battery pack.

11 Claims, 13 Drawing Sheets

FOREIGN PATENT DOCUMENTS

| | | |
|---|---|---|
| JP | 11-122827 | 4/1999 |
| JP | 11-308778 | 11/1999 |
| JP | 11-313447 | 11/1999 |
| JP | 2001-95167 | 4/2001 |
| JP | 2001-238361 | 8/2001 |
| JP | 02001238361 | 8/2001 |

\* cited by examiner

PRIOR ART

PRIOR ART

3bit — Refresh Timing Flag nbit — Number of Charges

| Charging Number | a4 | a5 | a6 | a7 | a8 | a9 | ...... |
|---|---|---|---|---|---|---|---|
| 0 | 0 | 0 | 0 | 0 | 0 | 0 | ...... |
| 15 | 1 | 1 | 1 | 1 | 0 | 0 | ...... |
| 16 | 0 | 0 | 0 | 0 | 1 | 0 | ...... |
| 31 | 1 | 1 | 1 | 1 | 1 | 0 | ...... |
| 32 | 0 | 0 | 0 | 0 | 0 | 1 | ...... |
|  |  |  |  |  |  |  |  |

FIG. 9

|  | Former half | Latter half |
|---|---|---|
| First Standard Refresh Required, Not Performed | 0 | 4 |
| First Standard Refresh Required, Performance Completed, Second Standard Refresh Required, Not Performed | 1 | 5 |
| Second Standard Refresh Required, Performance Completed | 3 | 7 |
| Refresh Not Required | 2 | 6 |

FIG. 15

|  | Former half | Latter half |
|---|---|---|
| Refresh Required, Not Performed | 1 | 5 |
| Refresh Required, Performance Completed | 3 | 7 |
| Refresh Not Required | 2 | 6 |

APPARATUS FOR REFRESHING BATTERIES

This application claims priority to Japanese patent application number 2002-84382, the contents of which are hereby incorporated by reference.

BACKGROUND OF THE INVENTION

1. Field of the Invention

The present invention relates to techniques for eliminating memory effects of rechargeable batteries (e.g., a nickel metal hydride battery, a nickel cadmium battery).

2. Description of the Related Art

Japanese Laid-open Patent Publication No. 7-143680 describes an appliance that is powered by a rechargeable battery (i.e., secondary battery). The known appliance has a charging device that is disposed within a housing of the appliance. The charging device includes a discharging circuit and a counter. The counter is utilized to count the number of charges of the battery. If the value of the counter is below a predetermined value when the battery is to be charged, the battery is charged, and the counter adds "1". On the other hand, if the value of the counter reaches a predetermined value when the battery is to be charged, the refresh process (i.e., discharging process) is performed on the battery, and the counter is cleared. That is, whenever a predetermined number of charges have been performed on the battery, the refresh process is automatically performed.

SUMMARY OF THE INVENTION

In the known charging device, the refresh process is performed only when the counter reaches the predetermined value. That is, the refresh process is less frequent than the charging process. However, the known charging device includes the discharging circuit. Therefore, the discharging circuit provided within the charging device cannot be effectively used.

It is, accordingly, an object of the present teachings to provide improved apparatus that can effectively perform the refresh process.

In one aspect of the present teachings, a battery pack may include one or more rechargeable batteries (e.g. nickel metal hydride batteries, nickel cadmium batteries). The battery pack may have a memory storing a flag that indicates whether a refresh process is required. The battery pack may be usually coupled to appliances (e.g., cordless power tools, cordless electric vacuum cleaners) and supply power to the appliances. When the battery pack is discharged, the battery pack may be preferably detached from the appliances. The battery pack detached from the appliances may be preferably connected directly to a battery charger.

The battery charger may have a charging circuit (e.g., power supply circuit) for charging the batteries of the battery pack. The battery charger may be also connected to an adapter. The adapter may be also connected to the battery pack. When the battery pack is connected to the adapter that is, in turn, connected to the battery charger, the battery pack may be preferably connected to the battery charger with the adapter interposed therebetween.

The adapter may have a discharging circuit for discharging the batteries of the battery pack. The adapter may also include a switching circuit for alternatively connecting the batteries of the battery pack with either the discharging circuit or the charging circuit of the charger. The adapter may further include a control circuit (e.g., a microprocessor or microcomputer) for controlling the switching circuit. When the battery pack has been connected to the battery charger with the adapter interposed therebetween, the control circuit controls the switching circuit on the basis of the flag stored in the memory of the battery pack. That is, if the flag is in the state indicating that the refresh process is required, the control circuit causes the battery pack to be connected with the discharging circuit, and discharging is performed. On the other hand, if the flag is in the state indicating that the refresh process is not required, the control circuit causes the rechargeable battery to be connected with the charging circuit, and charging is performed.

Therefore, when the battery pack is connected directly to the battery charger, the batteries of the battery pack can only be connected to the charging circuit, and the battery pack can only be charged. Alternatively, when the adapter is connected to the battery charger, and the battery pack is connected to the adapter, the batteries of the battery pack can be optionally connected to either the charging circuit or the discharging circuit. Consequently, the battery pack can be charged or the refresh process can be performed thereon. Accordingly, if one adapter is provided for a plurality of battery chargers and battery packs, the adapter can effectively perform the refresh process.

In another aspect of the present teachings, the memory may further store the total number of charges of the battery pack. That is, every time a charging process is performed on the battery pack, this charging process is counted and this counted number is stored in the memory. The flag, which is stored in the memory of the battery pack, may be capable of being in a state indicating, on the basis of a total number of charges of the battery pack, that the refresh process is required.

For example, if the refresh process is performed once for every n times a charge process is performed, when the total number of charges reaches n, the flag indicates that the refresh process is required. Thereupon, the refresh process is performed on the battery pack, and the flag switches to the state indicating that the refresh process is not required.

The flag may preferably indicate whether the refresh process is required in a first period or a second period of a refresh cycle. The refresh cycle may be preset, the first period occurring in a former half thereof and the second period occurring in a latter half thereof. The refresh cycle may be represented by the frequency with which the refresh process performed. For example, if the refresh process is to be performed once on average after n charges, the refresh cycle is set at n. The refresh cycle may be preferably determined based upon battery characteristics by the designer.

Further, the refresh cycle may be divided into a former half and a latter half. The first period and the second period, in which the refresh process is performed, may be preset within the duration of the former half and latter half respectively. For example, the first period may equally well last the entire duration of the former half of the refresh cycle. The second period may equally well, for example, last the entire duration of the latter half of the refresh cycle.

The flag may preferably have the following states: (1) a first state indicating that the refresh process is required in the first period and that the refresh process has not yet been performed; (2) a second state indicating that the refresh cycle has been performed in the first period; (3) a third state indicating that the refresh process is not required in the first period; (4) a fourth state indicating that the refresh process is required in the second period and that the refresh process has not yet been performed; (5) a fifth state indicating that the refresh process has been performed in the second period;

and (6) a sixth state indicating that the refresh process is not required in the second period.

When it is determined from the total number of charges stored in the memory that the battery pack is in the first period, and the flag indicates the first state, the fourth state, or the sixth state, the control circuit may cause the refresh process to be performed on the battery pack. After the refresh process is completed, the control circuit may change the flag of the memory to the second state. For example, if the refresh cycle is "40", the first period is equal to the former half of the refresh cycle, and the second period is equal to the latter half of the refresh cycle. Then, when the total number of charges of the battery pack is "50", it can be determined that the battery pack is in the former half of the refresh cycle, i.e., in the first period. Thus, when the flag indicates the first state, the fourth state, or the sixth state, (that is, when the refresh process has not been performed in the second period of the immediately preceding refresh cycle), the refresh process is performed. When the refresh process has been performed, the flag is changed to the second state. By contrast, if it is determined from the total number of charges stored in the memory that the battery pack is in the first period, and the flag indicates the fifth state, the control circuit may preferably change the flag of the memory to the third state. That is, the refresh process has been performed on the battery pack in the second period in the latter half of the immediately preceding refresh cycle, and the refresh process is not performed in the first period in the former half of the refresh cycle. As a result, the interval between refresh processes is not excessively brief.

Similarly, if it is determined from the total number of charges stored in the memory circuit that the battery pack is in the second period, and the flag indicates the first state, the third state, or the fourth state, the control circuit may cause the refresh process to be performed on the battery pack, and change the flag of the memory to the fifth state after the refresh process is completed. Furthermore, if it is determined from the total number of charges stored in the memory that the battery pack is in the second period, and the flag indicates the second state, the control circuit may also change the flag of the memory to the sixth state.

In another aspect of the present teachings, the refresh process of the first period or the second period may equally well be set such that discharging is repeated a plurality of times (twice, for example) therein. This plurality of discharges can reliably eliminate memory effects in the rechargeable battery. In this case, the control circuit may cause only one discharging to be performed per attachment of the battery pack. Since a plurality of discharges is not performed per one attachment, less time elapses between the attachment of the battery pack and the completion of charging. However, it is possible that a plurality of discharges is performed neither in the first period nor the second period. This has the consequence that the control circuit does not cause the refresh process to be performed within these periods. If, within the first period (or the second period), a plurality of discharges is not performed (that is, if the rechargeable battery is not attached a plurality of times to the battery charger with the adapter interposed therebetween), the refresh process may be preferably performed once again in the second period (or the first period).

In another aspect of the present teachings, the battery charger is provided with an indicating device (e.g., indicator, display) and a processor that is capable of communicating with the memory of the battery pack. When the battery pack has been directly attached to the battery charger, the processor may read the flag in the memory of the battery pack. If the flag is in a state indicating that the refresh process is required, this may be preferably indicated by the indicating device.

These aspects and features may be utilized singularly or, in combination, in order to make improved power tools, including but not limited to, impact wrenches and impact screwdrivers. In addition, other objects, features and advantages of the present teachings will be readily understood after reading the following detailed description together with the accompanying drawings and claims. Of course, the additional features and aspects disclosed herein also may be utilized singularly or, in combination with the above-described aspects and features.

BRIEF DESCRIPTION OF THE DRAWINGS

FIG. 9 shows numerical values of the refresh timing flag of the first representative embodiment, and states corresponding to each numerical value thereof.

FIG. 15 shows numerical values of a refresh timing flag of another representative embodiment, and states corresponding to each numerical value thereof.

DETAILED DESCRIPTION OF THE INVENTION

Detailed Representative Embodiment

Figure 1:
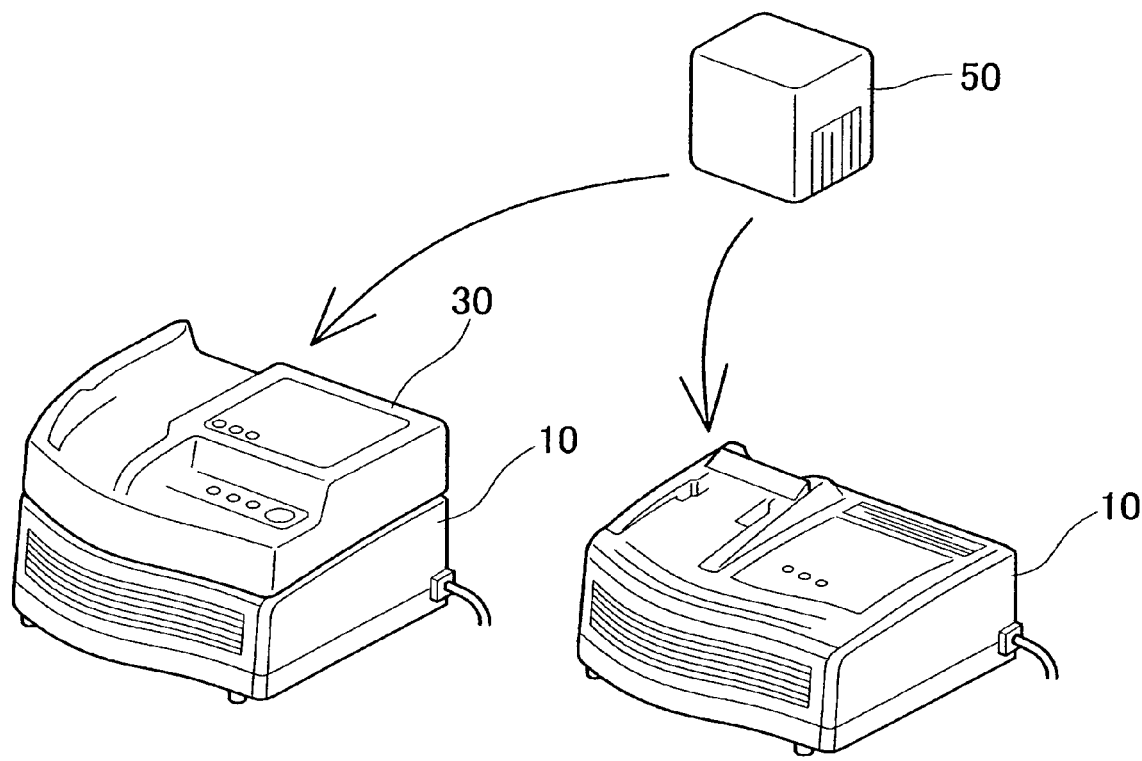
FIG. 1 shows a battery charger, an adapter and a battery pack of a first representative embodiment.
Figure 2:
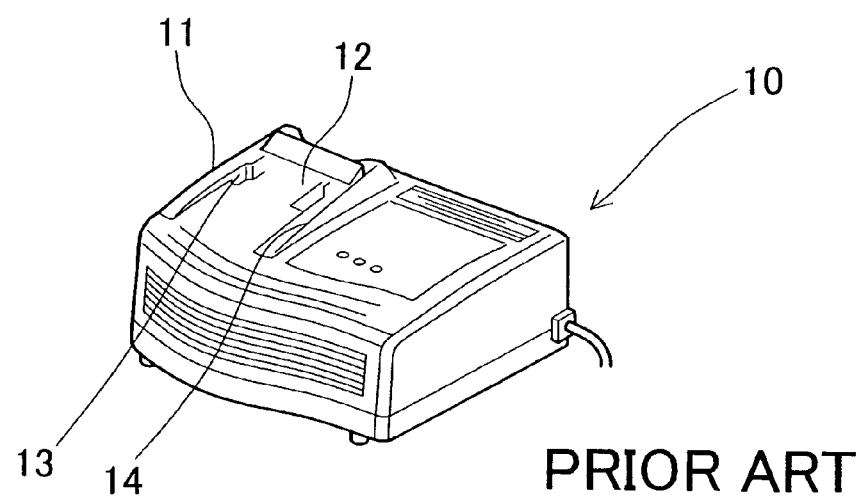
FIG. 2 is a perspective view showing the external appearance of the battery charger of the first representative embodiment.
Figure 3:
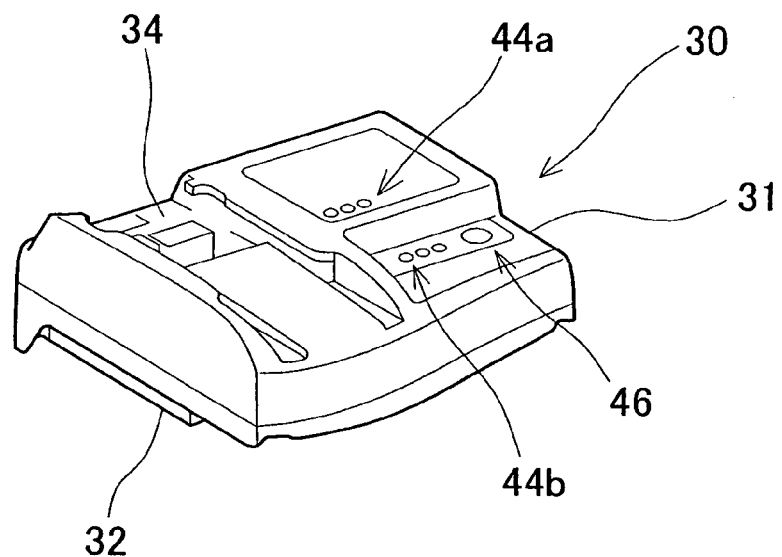
FIG. 3 is a perspective view showing the external appearance of the adapter of the first representative embodiment.
Figure 4:
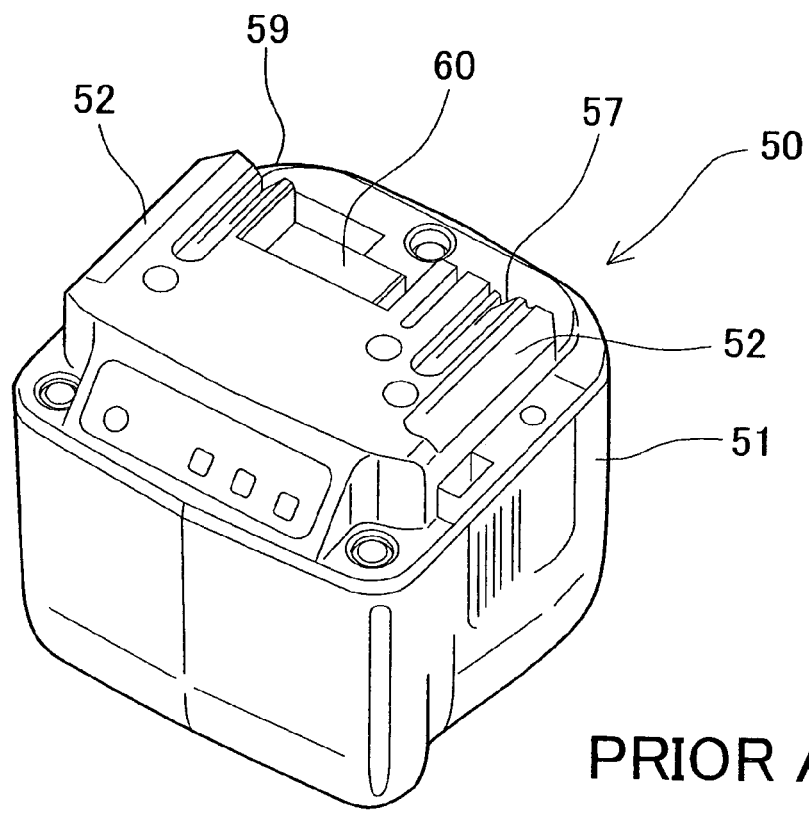
FIG. 4 is a perspective view showing the external appearance of the battery pack of the first representative embodiment.
Figure 5:
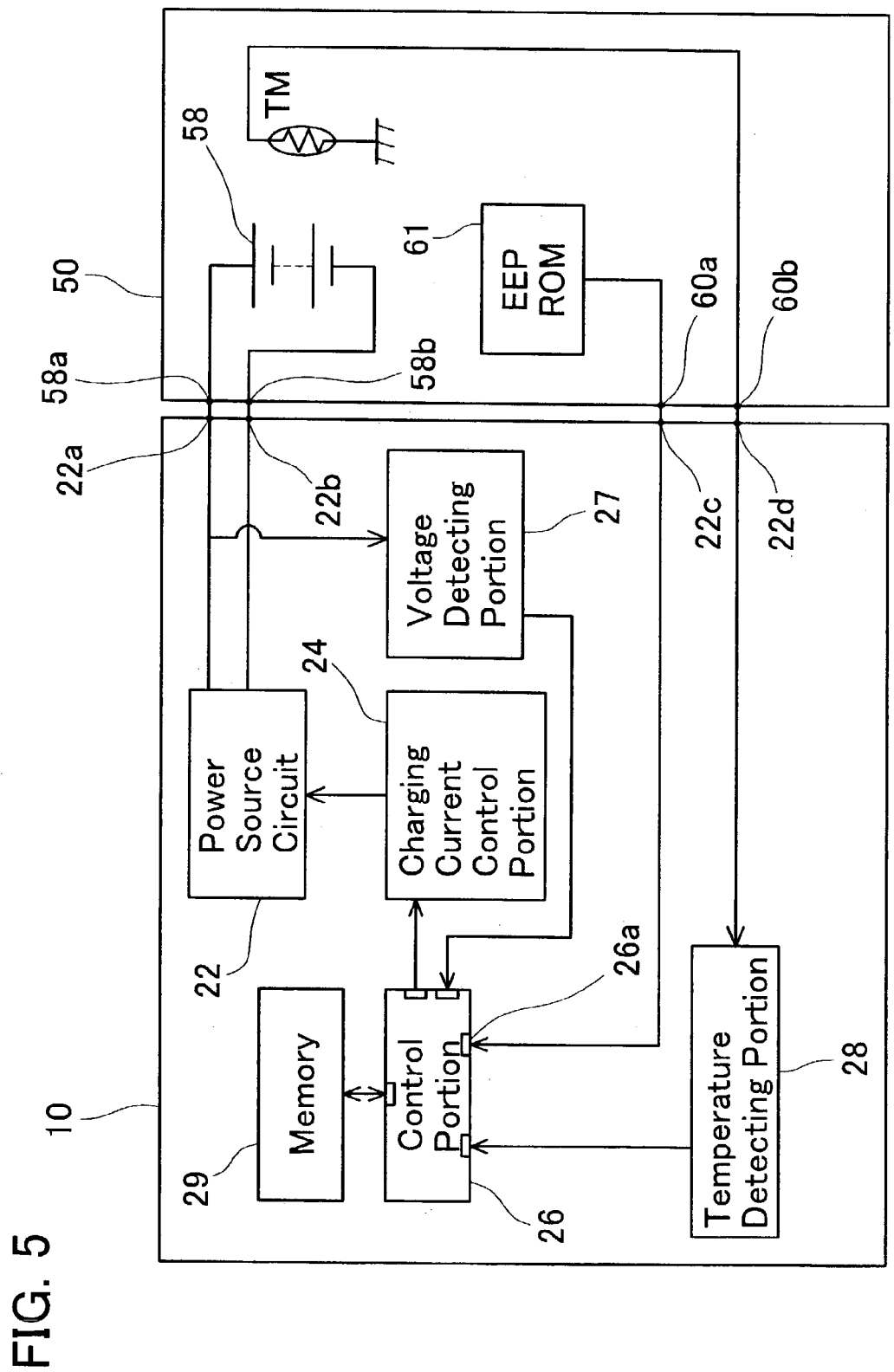
FIG. 5 is a block diagram that identifies functions performed when the battery pack is coupled to the charger.
Figure 6:
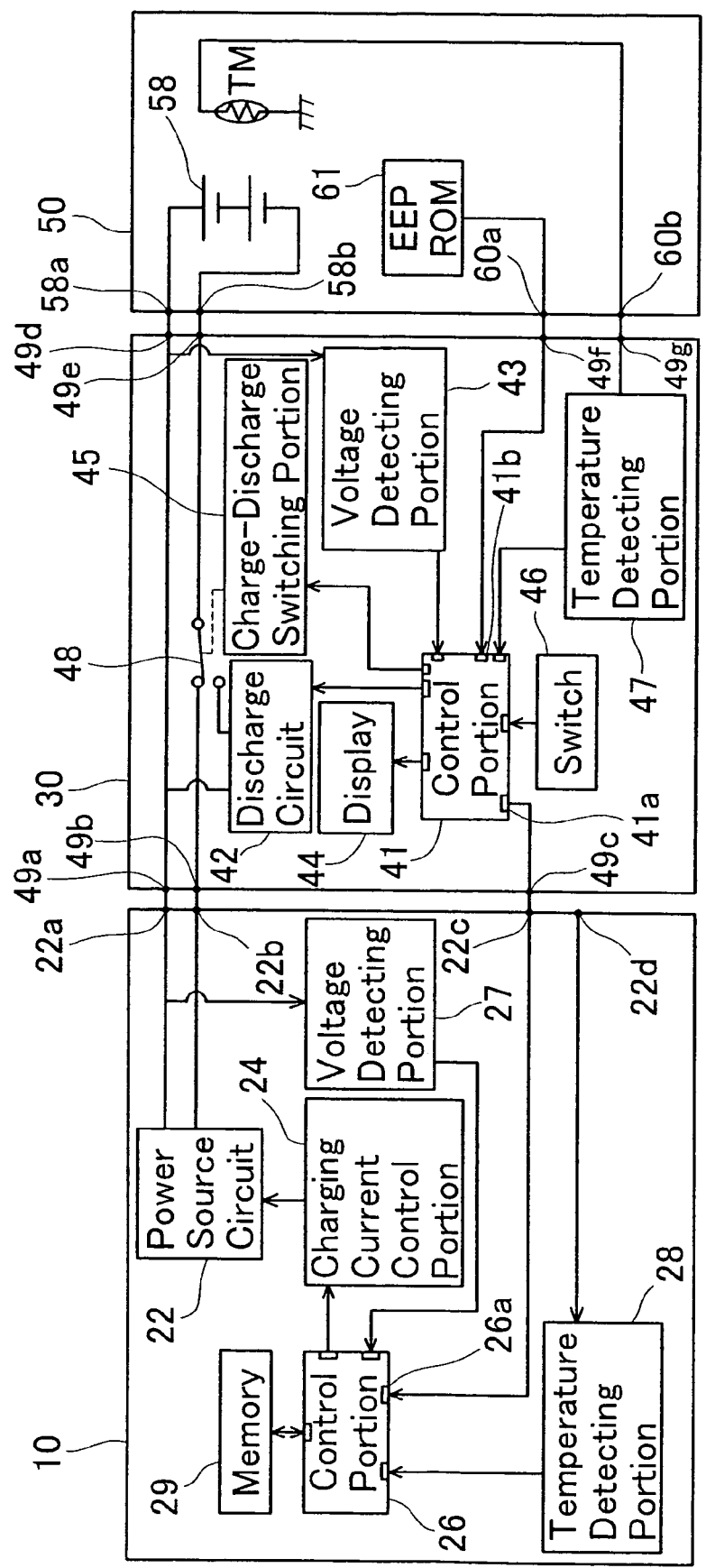
FIG. 6 is a block diagram that identifies functions performed when the adapter is coupled to the charger.

FIG. 1 shows a detailed representative embodiment of a battery charger 10, an adapter 30 and a battery pack 50 according to the present teachings. FIG. 2 shows the external appearance of battery charger 10, FIG. 3 shows the external appearance of adapter 30 and FIG. 4 shows the external appearance of battery pack 50. FIG. 5 shows a block diagram that identifies functions of battery charger 10 when it is directly coupled to battery pack 50. FIG. 6 shows a block diagram that identifies functions of battery charger 10 when it is coupled to battery pack via adapter 30.

As shown in FIG. 1, battery charger 10 can be coupled to either adapter 30 or battery pack 50. When adapter 30 is coupled to battery charger 10 (the state shown on the left in FIG. 1), battery pack 50 can be coupled to battery charger 10 via adapter 30. When adapter 30 is not coupled to battery charger 10 (the state shown on the right in FIG. 4), battery pack 50 can be directly coupled to battery charger 10.

As shown in FIG. 5, battery pack 50 may include a plurality of nickel metal hydride batteries 58 that are serially connected within a substantially rectangular-shaped resin housing 51. Battery pack 50 may also include temperature sensor TM which detects the temperature of batteries 58. Temperature sensor TM may include a thermister having an electrical resistance that varies in accordance with variation in temperature.

Battery pack 50 may further include EEPROM 61. EEPROM 61 may store information such as the refresh timing flag, the total number of charges performed on battery pack 50, etc. The refresh timing flag is a flag indicating whether a refresh process needs to be performed on battery pack 50. The total number of charges is information used to manage the battery life of battery pack 50.

Figures 7, 8:
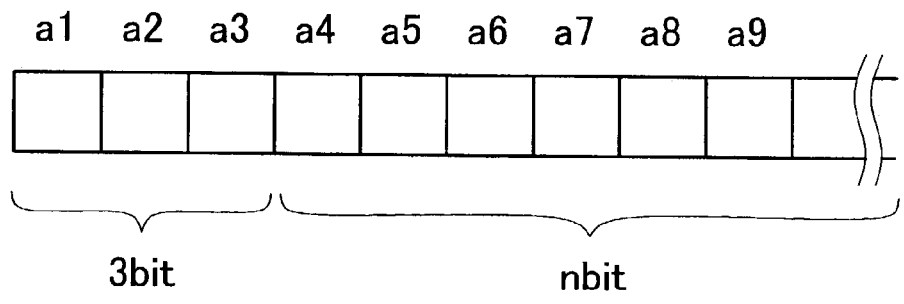
FIG. 7 is a representative memory structure for the first representative embodiment.
FIG. 8 is a representative memory structure for the total charging number of FIG. 7.

FIG. 7 shows a representative memory structure for EEPROM 61. The refresh timing flag may be stored within the three bits (a1–a3) of EEPROM 61. The numbers (0–7) may be used for the refresh timing flag, these eight numbers indicating the eight states of battery pack 50.

In the representative embodiment, the refresh cycle (the frequency with which the refresh process is performed) is set at 32 cycles. That is, the refresh process is performed an average of once per 32 charges. The refresh cycle is set at 32 cycles so that the refresh process is performed before the memory effects has proceeded too far. The reason for this is that if the memory effects proceed too far, charging and discharging must be performed a plurality of times in succession to eliminate memory effects.

Furthermore, the refresh cycle is divided into a former half and a latter half When the refresh process is performed in the former half of the refresh cycle, no refresh process is performed in the latter half, when the refresh process is performed in the latter half of the refresh cycle, no refresh process is performed in the former half The refresh process occurs at an interval of at least half the value of the refresh cycle (i.e., 16 charges) so that the refresh process is not performed frequently.

In the representative embodiment, one refresh process includes a first standard refresh process and a second standard refresh process. Discharging may be performed once in the first standard refresh process, and may be also performed once in the second standard refresh process. Performing two standard refresh processes during one refresh process in this manner has the following purpose: the first standard refresh process eliminates the memory effects of batteries 58; and the battery capacity is measured during the charging after the second standard refresh process. Since the memory effects of batteries 58 have been eliminated in the first standard refresh process, the battery capacity can be measured accurately.

As is clear from the above description, the refresh timing flag of the representative embodiment indicates the eight states of battery pack 50. FIG. 9 shows eight states of battery pack 50 corresponding to each refresh timing flag. That is, when the refresh timing flag is [0], this indicates a state wherein the first standard refresh process is required in the former half of the refresh cycle, and has not been performed. When the refresh timing flag is [1], this indicates a state wherein the first standard refresh process is completed in the former half of the refresh cycle, and the second standard refresh process has not been performed in the former half of the refresh cycle. When the refresh timing flag is [3], this indicates a state wherein the first standard refresh process and the second standard refresh process have been completed in the former half of the refresh cycle. When the refresh timing flag is [2], this indicates that the refresh process is not required in the former half of the refresh cycle.

Similarly, when the refresh timing flag is [4], this indicates a state wherein the first standard refresh process is required in the latter half of the refresh cycle, and has not been performed. When the refresh timing flag is [5], this indicates a state wherein the first standard refresh process is completed in the latter half of the refresh cycle, and the second standard refresh process has not been performed in the latter half of the refresh cycle. When the refresh flag is [7], this indicates a state wherein the first standard refresh process and the second standard refresh process have been completed in the latter half of the refresh cycle. When the refresh flag is [6], this indicates that the refresh process is not required in the latter half of the refresh cycle.

FIG. 8 shows the total number of charges stored in EEPROM 61. The total number of charges may be stored within the bits (a4–a"i" (i>9)) of the EEPROM 61. That is, when battery pack 50 is charged once, "1" is added to the values stored in the bits (a4–a"i"). In the values stored in the EEPROM 61, bit (a4) represents the least significant bit, and bit (a5), bit (a6) . . . represent increasing upper order bits. Consequently, when the total number of charges reaches "16", the bits (a4–a7) are [0], and the bit (a8) is [1]. As described earlier, the refresh cycle is set at 32 cycles in the representative embodiment. Accordingly, it is determined from the value of the bit (a8) whether battery pack 50 is in the former half or the latter half of the refresh cycle. That is, it is determined that battery pack 50 is in the former half of the refresh cycle if the bit (a8) is [0]. It is determined that battery pack 50 is in the latter half of the refresh cycle if the bit (a8) is [1].

As shown in FIG. 4, a pair of engaging portions 52 is formed on an upper side of housing 51 of battery pack 50. The pair of engaging portions 52 engages corresponding portion of power tool (e.g., a battery-powered impact driver), or corresponding portion of battery charger 10, or corresponding portion of adapter 30. Positive terminal groove 57, negative terminal groove 59, and connecter 60 are disposed on the upper side of housing 51 between engaging portions 52. A positive terminal 58a and a negative terminal 58b are respectively disposed within positive terminal groove 57 and the negative terminal groove 59. When battery pack 50 is attached to power tool, or battery charger 10, or adapter 30, the positive terminal 58a and the negative terminal 58b contact the terminals of power tool, or battery charger 10, or adapter 30. Terminals 60a, 60b are provided within the interior of connector 60 in order to connect to temperature sensor TM or EEPROM 61.

Battery charger 10 for charging the battery pack 50 will now be described in further detail with reference to FIGS. 2 and 5. As shown in FIG. 2, battery charger 10 may comprise housing 11 that includes engaging portion 12 onto which battery pack 50 and adapter 30 can be mounted. Various indicators (displays) may be provided on housing 11, such as a capacity indicating lamp for indicating the remaining battery capacity of battery pack 50 being discharged, an operation condition indicating lamp for indicating the operating condition of battery charger 10, etc. A control circuit of battery charger 10 may control the illumination of these indicators and will be further described below.

Engaging portion 12 may include guides 13 and 14 that serve to guide engaging portion 52 of battery pack 50 and a lower face of adapter 30. Engaging portion 12 may also include output terminals 22a, 22b that electrically couple to the positive terminal 58a and the negative terminal 58b of battery pack 50. A connector may be also provided that can be connected to connector 60 of battery pack 50. Thus, the control circuit disposed within battery charger 10 can obtain battery temperature information from battery pack 50 via connector.

As shown in FIG. 5, the control circuit of battery charger 10 may include the following functional circuits: power source circuit 22, charging-current control portion 24, control portion 26, battery voltage detecting portion 27, battery temperature detecting portion 28 and memory 29. Power source circuit 22 provides a charging current that is suitable for batteries 58 of battery pack 50. During charging, battery temperature detecting portion 28 may detect the temperature of batteries 58 using battery temperature sensor TM. Battery voltage detecting portion 27 detects battery voltage. Memory 29 stores current control information, such as a map that stores specific values corresponding to appropriate charging currents, which are supplied to batteries 58 in accordance with the rate of battery temperature increase.

Control portion 26 may comprise a microprocessor or microcomputer that includes, e.g., central processing unit (CPU), read only memory (ROM), random access memory and input/output port (I/O). Control portion 26 may differentiate a temperature value, which was output from temperature detecting portion 28, in order to calculate a temperature increase rate, and then determine the appropriate charging current value based upon the current control information stored in memory 29. Thereafter, control portion 26 may output the selected charging current value, which serves as a current instruction value, to charging-current control portion 24. Charging-current control portion 24 may be also capable of controlling power source. circuit 22 based upon the current instruction value from control portion 26 so as to adjust the charging current that is supplied to battery pack 50.

Power source circuit 22, charging-current control portion 24, control portion 26, battery voltage detecting portion 27, battery temperature detecting portion 28 and memory 29 are substantially the same as the battery charger described in Japanese Patent Application No. 11-081247, which was filed by the inventor of the present invention. That patent application discloses battery charging techniques involving the detection of the battery temperature of batteries 58 using temperature sensor TM and increasing or decreasing the charging current based upon the detected battery temperature.

When battery pack 50 is mounted on engaging portion 12 of battery charger 10, which may have the above-described structure, control portion 26 utilizes a specific algorithm in order to control power source circuit 22, charging-current control portion 24, voltage detecting portion 27, temperature detecting portion 28 and memory 29. As a result, batteries 58 within battery pack 50 are charged. During the charging operation, the capacity indicating lamp is illuminated in order to indicate the battery capacity of battery pack 50. Upon completion of the charging operation, charging is terminated and the same lamp will therefore indicate charge completion. Control portion 26 also includes communication port 26a, which may, e.g., receive charging instructions( described in further detail below) from adapter 30 that may utilized to control the charging current.

Adapter 30 for charging and discharging the battery pack 50 will now be described in further detail with reference to FIGS. 3 and 6. As shown in FIG. 3, engaging portion 32 may be formed on a lower surface of housing 31 of adapter 30 and can engage engaging portion 12 of battery charger 10. Engaging portion 34, onto which battery pack 50 can be mounted, may also be formed on an upper surface of housing 31.

Switch 46 for starting a full refresh process may be provided on an upper surface of housing 31. The full refresh process is a process, initiated by the operator, wherein the charging and discharging processes are repeated a plurality of times. Specifically, charging is first performed, followed by discharging, then charging again followed by discharging. Finally charging is performed and the process is completed. Repeating the charging and discharging twice in this manner eliminates the inert state of a battery pack 50 that was in a deeply inert state due to a long period of disuse, and the repeated dischargings during the full refresh process eliminate deep memory effects. In contrast to the refresh process performed automatically by adapter 30, the full refresh process requires approximately six hours.

Display 44 may be provided on the upper surface of housing 31. Display 44 may include capacity indicating lamp 44a for indicating the remaining battery capacity of battery pack 50, and a refresh indicating lamp 44b for indicating the operating condition of adapter 30. A control circuit of adapter 30 may control the illumination of capacity indicating lamp 44a and refresh indicating lamp 44b.

Capacity indicating lamp 44a may comprise one red lamp and two green lamps. The red lamp of capacity indicating lamp 44a is illuminated during the refresh process. If the capacity of battery pack 50 is less than 40% of its brand-new capacity after the refresh process has been completed, both one red lamp and two green lamps blink on and off alternately in order to indicate the operator that the life of battery pack 50 is over.

Refresh indicating lamp 44b may preferably comprise three lamps. While the refresh process is being performed by adapter 30, one left side lamp of refresh indicating lamp 44b may blink rapidly on and off. The refresh indicating lamp 44b may further indicate the capacity of battery pack 50 after the refresh process has been completed (that is, after the full refresh process has been completed, or after the second standard refresh process). If the capacity of battery pack 50 is 80% or more of its brand-new capacity, all three lamps are lit. If the capacity is 60–80% of its brand-new capacity, the two left-most lamps are lit. If the capacity is 40–60% of its brand-new capacity, the one left-most lamp is lit. In this manner, the remaining life of battery pack 50 is indicated.

Engaging portion 32 may include input terminals 49a, 49b that electrically couple to the output terminals of battery charger 10. A connector may be further provided that can be connected to connector of battery charger 10. Engaging portion 34 may also include output terminals 49d, 49e that electrically couple to the positive terminal 58a and the negative terminal 58b of battery pack 50. Another connector may be further provided that can be connected to connector of battery pack.

As shown in FIG. 6, the control circuit of adapter 30 may include control portion 41, battery temperature detecting portion 47 and battery voltage detecting portion 43. The control circuit of adapter 30 may also include discharge circuit 42 that may comprise a resistance functioning as a load during the discharge operation. The control circuit of adapter 30 may further include relay 48 that may be utilized to switch between the charging operation and the discharging operation, and a charge-discharge switching portion 45 that may be utilized to control the relay 48.

Control portion 41 may comprise a microprocessor or microcomputer that includes, e.g., central processing unit (CPU), read only memory (ROM), random access memory and input/output port (I/O). Control portion 41 of adapter 30 may execute communication functions in order to communicate information to control portion 26 of battery charger 10. More particularly, communication is established between communication port 41a and communication port 26a of control portion 26 of battery charger 10. Further, control portion 41 of adapter 30 may also have a communication port 41b in order to receive information from EEPROM 61 of battery pack 50.

When battery pack 50 is mounted, control portion 41 of adapter 30 first reads the total number of charges and the refresh timing flag from EEPROM 61 of battery pack 50, and determines whether the refresh process needs to be performed. If it is determined that the refresh process is required, relay 48 is connected with discharge circuit 42 via charge-discharge switching portion 45, and the power of batteries 58 of battery pack 50 is discharged. Then, relay 48 is connected with power source circuit 22 of battery charger 10 via charge-discharge switching portion 45, and batteries 58 of battery pack 50 are charged. During charging, control portion 41 of adapter 30 sends charging instructions to control portion 26 of battery charger 10. Control portion 26 of battery charger 10 controls the charging current based upon the charging instructions from control portion 41 of adapter 30. If it is determined that the refresh process is not required, relay 48 is connected with power source circuit 22 of battery charger 10 via charge-discharge switching portion 45, and batteries 58 of battery pack 50 are charged. The charging current during charging is controlled in the same manner as the charging after the refresh process, as described above. In addition, when the operator actuates switch 46, relay 48 is connected with power source circuit 22 and discharge circuit 42 alternately. Thus, batteries 58 of battery pack 50 are charged and discharged alternately.

The operation of adapter 30 will now be described for the case when battery pack 50 has been attached to battery charger 10 with adapter 30 interposed therebetween. On the other hand, the operation of battery charger 10 when battery pack 50 is attached directly thereto is substantially same as the operation of the battery charger disclosed in Japanese Patent Application No. 11-081247. Consequently, a detailed description thereof is omitted here.

Figure 10:
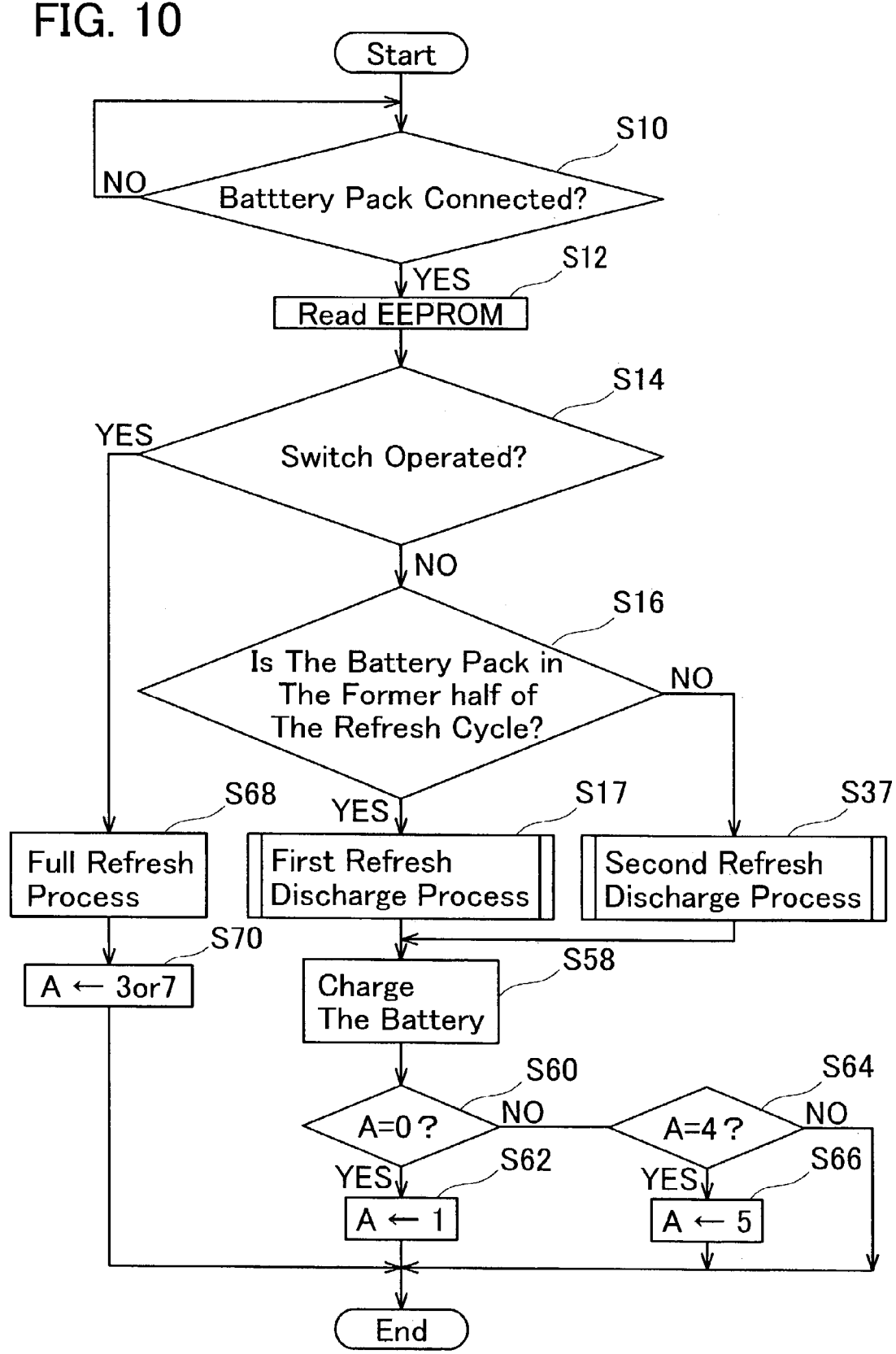
FIG. 10 is a flowchart that shows process steps performed by a control portion of the adapter.

FIG. 10 shows the flowchart of the representative process executed by control portion 41 of adapter 30. Control portion 41 of adapter 30 may first determine whether battery pack 50 is mounted on adapter 30 (step S10). Step S10 becomes YES when control portion 41 detects the battery voltage (using voltage detecting portion 43) and/or when control portion detects the battery temperature (using temperature detecting portion 28). If battery pack 50 is mounted on adapter 30 (YES in step S10), information stored in EEPROM 61 is read (step S12). In step S12, the refresh timing flag and the total number of charges stored in the EEPROM 61 are read.

In step S14, control portion 41 of adapter 30 determines whether switch 46 for starting the full refresh operation has been operated. If step S14 is YES (that is, when switch 46 is operated), the process proceeds to step S68. In step S68, the full refresh process is performed. In the full refresh process, first, relay 48 is operated connecting power source circuit 22 with batteries 58, the charging process is performed, and batteries 58 are left quiescent until they have cooled. Next, relay 48 is operated connecting batteries 58 with discharge circuit 42, and batteries 58 are forcibly discharged. The discharging is complete when the battery voltage reaches the discharge-completion voltage. Batteries 58 that have attained a high temperature as a result of discharging are left quiescent until they have cooled. Next, charging and discharging are repeated in an order identical to that described above. Finally batteries 58 are charged and the process is complete. By this means, batteries 58 of battery pack 50 are fully refreshed, and degradation of the battery, owing to a deeply inert state or deep memory effects, is eliminated.

When the full refresh process is completed, control portion 41 changes the refresh timing flag of EEPROM 61(step S70). Specifically, if the total number of charges read in step S12 is in the former half of the refresh cycle, the refresh timing flag is changed to [3]. If the total number of charges is in the latter half of the refresh cycle, the refresh timing flag is changed to [7].

If step S14 is NO, the process proceeds to step S16. In step S16, control portion 41 determines whether battery pack 50 that has been attached is in the former half of the refresh cycle. Specifically, this is determined on the basis of the total number of charges read in step S12 (i.e., on the basis of whether bit (a8) of EEPROM 61 is [0] or [1]). If bit (a8) is [0], it is determined that battery pack 50 is in the former half of the refresh cycle. If bit (a8) is [1], it is determined that battery pack 50 is in the latter half of the refresh cycle.

Figure 11:
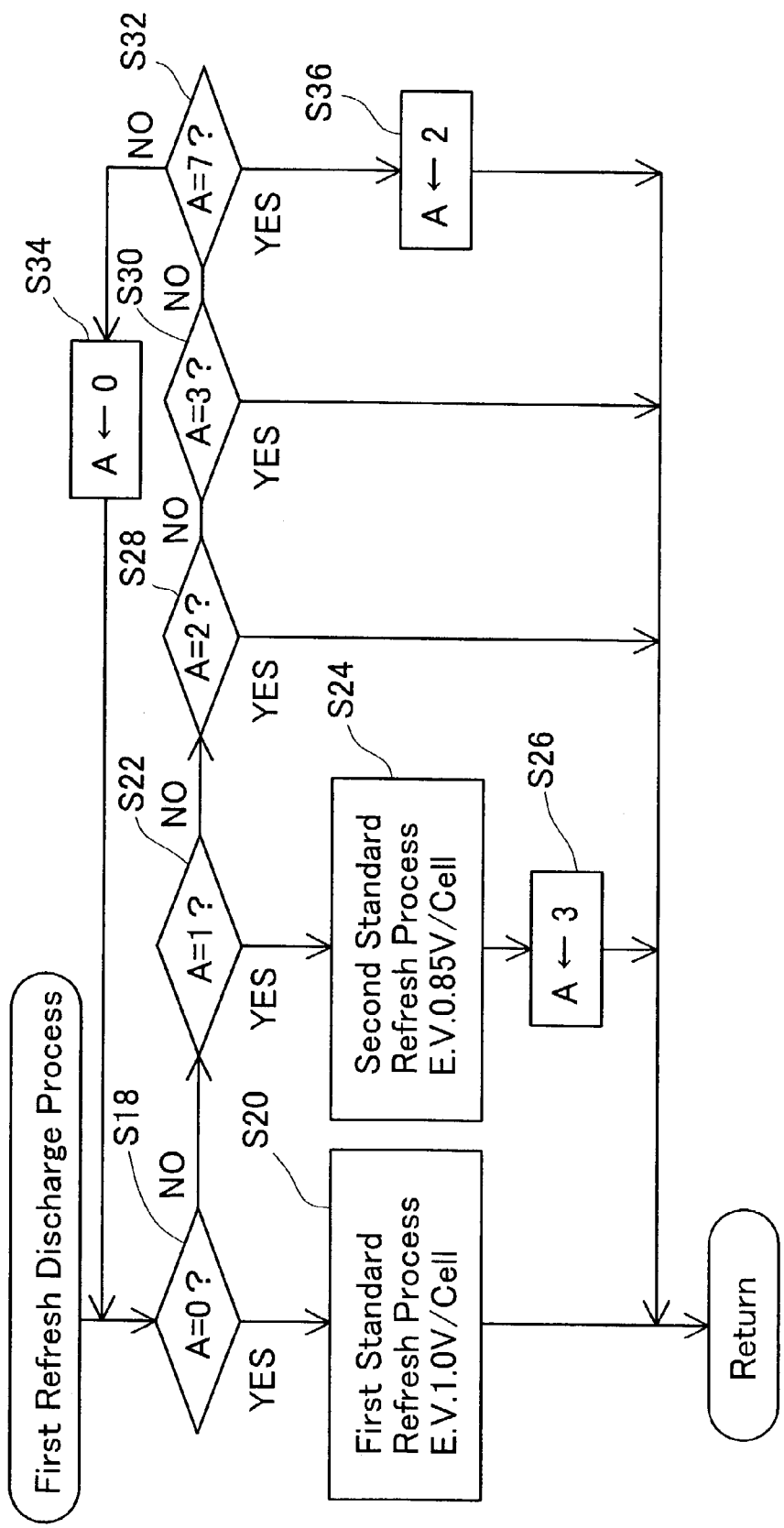
FIG. 11 shows a flowchart that explains the operation of the first refresh process.

If battery pack 50 is in the former half of the refresh cycle (YES in step S16), first refresh discharge process is started by control portion 41 (step S17). The first refresh discharge process will be described with reference to FIG. 11. First, control portion 41 determines whether the refresh timing flag [A], which is read in step S12 of FIG. 10, is [0] (step in S18). If the refresh timing flag [A] is [0] (YES instep S18), the first standard refresh process is performed (step S20). When the refresh timing flag is [0], the first standard refresh process is required in the former half of the refresh cycle, and has not yet been executed (see FIG. 9). As a result, control portion 41 initiates the first standard refresh process. Specifically, relay 48 is operated, connecting batteries 58 with discharge circuit 42, and batteries 58 are forcibly discharged. Discharging is complete when the battery voltage reaches a predetermined discharge-completion voltage (1.0 V per cell). Then, batteries 58 that have attained a high temperature as a result of discharging are left quiescent until they have cooled. When the first standard refresh process is completed, the process proceeds to step S58 of FIG. 10.

If the refresh timing flag [A] is not [0] (NO in step S18), it is next determined whether the refresh timing flag [A] is [1] (step S22). If the refresh timing flag [A] is [1] (YES in step S22), the second standard refresh process is performed (step S24). When the refresh timing flag is [1], the second standard refresh process is required in the former half of the refresh cycle, and has not yet been executed (see FIG. 9). As a result, control portion 41 initiates the second standard refresh process. The second standard refresh process is performed in essentially the same manner as the first standard refresh process, except that the discharge-completion voltage differs from that in the first standard refresh process. The discharge-completion voltage in the second standard refresh process is 0.8 V per cell. That is, discharging is performed more deeply in the second standard refresh process than in the first standard refresh process.

When the second refresh process is completed, the refresh timing flag of the EEPROM 61 is changed to [3] (step S26), and the process proceeds to step S58 of FIG. 10. That is, the refresh processes in the former half of the refresh cycle are completed upon completion of the second refresh process, and consequently the refresh timing flag is changed to [3].

If the refresh timing flag [A] is not [1] (NO in step S22), it is next determined whether the refresh timing flag [A] is [2] (step S28). If the refresh timing flag [A] is [2] (YES in step S28), the refresh process is not required in the former half of the refresh cycle, and consequently the process proceeds to step S58 of FIG. 10. If the refresh timing flag [A] is not [2] (NO in step S28), it is determined whether the refresh timing flag [A] is [3] (step S30). If the refresh timing flag [A] is [3] (YES in step S30), the refresh process has already been completed in the former half of the refresh cycle, and consequently the process proceeds to step S58 of FIG. 10.

If the refresh timing flag [A] is not [3] (NO in step S30), it is determined whether the refresh timing flag [A] is [7] (step S32). If the refresh timing flag [A] is [7] (YES in step S32), the refresh process has already been completed in the latter half of the preceding refresh cycle. Consequently, the refresh timing flag is changed to [2] (step S36), and the process proceeds to step S58 of FIG. 10. That is, it is not necessary to perform the refresh processes in the former half of the refresh cycle if the refresh processes have been completed in the latter half of the preceding refresh cycle, and consequently the refresh timing flag can be changed to [2].

If the refresh timing flag [A] is not [7] (NO in step S32), the refresh timing flag [A] is changed to [0] (step S34), and the process returns to step S18. That is, if the refresh timing flag [A] is not [7], the refresh timing flag [A] is either [4], [5], or [6]. In the case where the refresh timing flag has any of these numerical values, the refresh processes have not been completed in the latter half of the preceding refresh cycle. As a result, the refresh timing flag [A] is changed to [0], this causing the step S18 to be determined as YES, and the first standard refresh process is performed.

Figure 12:
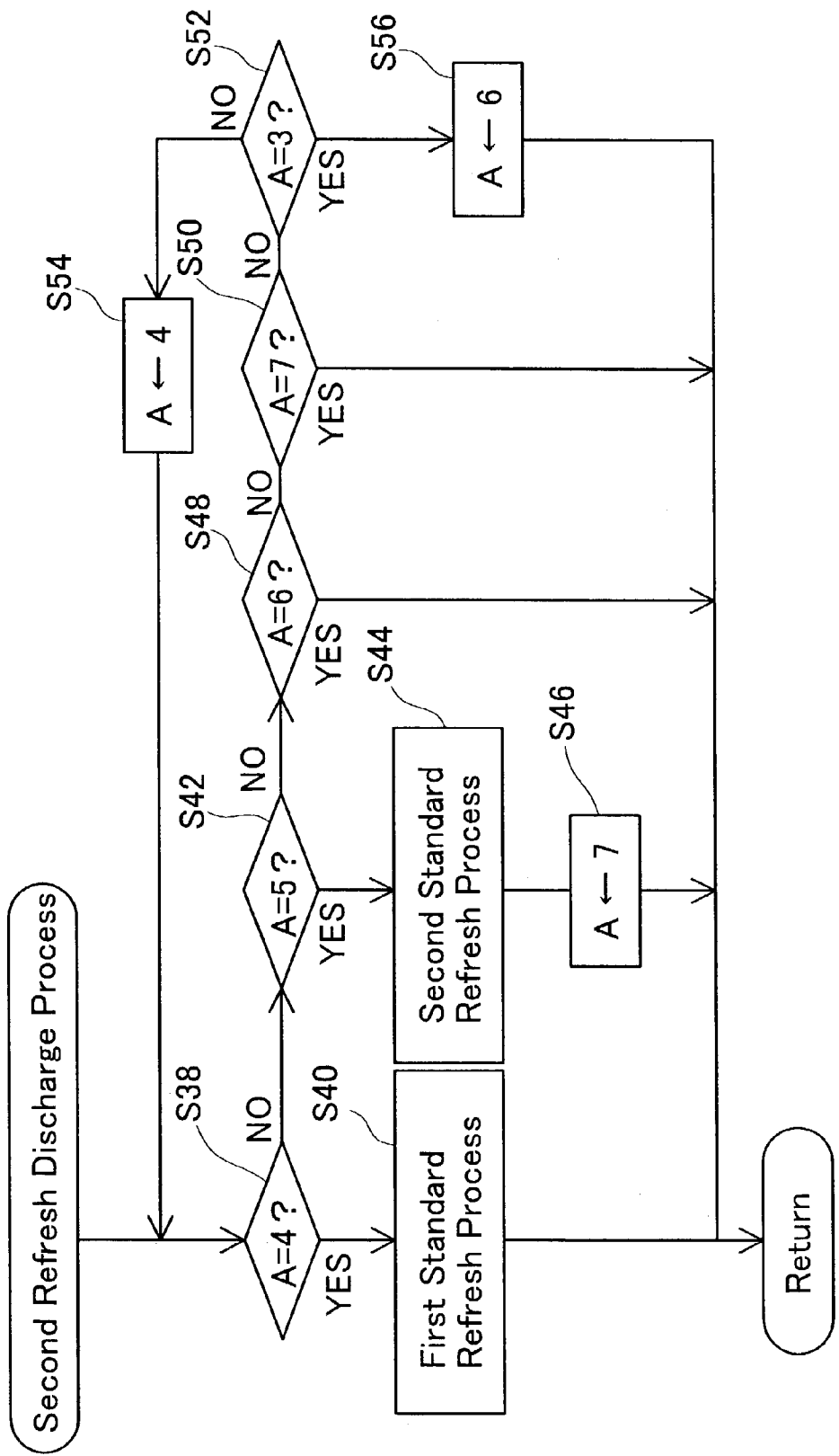
FIG. 12 shows a flowchart that explains the operation of the second refresh process.

On the other hand, if battery pack 50 is not in the former half of the refresh cycle (NO in step S16 of FIG. 10), second refresh discharge process is started by control portion 41 (step S37). The second refresh discharge process will be described with reference to FIG. 12. As shown in FIG. 12, the second refresh discharge process is performed in a manner fundamentally identical with the first refresh discharge process. That is, if the refresh timing flag [A] is [4] (YES in step S38), the first standard refresh process is performed (step S40). If the refresh timing flag [A] is [5] (YES in step S42), the second standard refresh process is performed (S44), and the refresh timing flag [A] is changed to [7]. If the refresh timing flag [A] is [6] or [7] (YES in step S48, or YES in step S50), the process proceeds to step S58 of FIG. 10. If the refresh timing flag [A] is [3](YES in step S52), the refresh timing flag [A] is changed to [6] (step S56). If the refresh timing flag [A] is not [3] (NO in step S52), i.e., the refresh timing flag is [0], [1], or [2], the refresh timing flag is changed to [4].

Referring back to FIG. 10, batteries 58 of battery pack 50 are charged (step S58). Specifically, control portion 41 operates relay 48 to connect power source circuit 22 of battery charger 10 with batteries 58. Further, control portion 41 sends charging instructions (e.g., battery temperature, battery voltage) to control portion 26 of battery charger 10. Control portion 26 controls charging-current control portion 24 on the basis of these charging instructions, and batteries 58 are charged.

In step S60, it is determined whether the refresh timing flag [A] is [0]. If the refresh timing flag [A] is [0] (YES in step S60), the refresh timing flag [A] changes to [1] (step S62). As a result, in the case where charging is subsequently to be performed in the former half of the refresh cycle, when battery pack 50 is mounted on adapter 30, the second standard refresh process is performed on batteries 58 of battery pack 50.

If the refresh timing flag [A] is not [0] (NO in step S60), it is determined whether the refresh timing flag [A] is [4] (step S64). If the refresh timing flag [A] is [4] (YES in step S64), the refresh timing flag [A] is changed to [5] (step S66). As a result, in the case where charging is subsequently to be performed in the latter half of the refresh cycle, when battery pack 50 is mounted on adapter 30, the second standard refresh process is performed on batteries 58 of battery pack 50. If the refresh timing flag [A] is not [4] (NO in step S64), the process is completed immediately.

Figure 13:
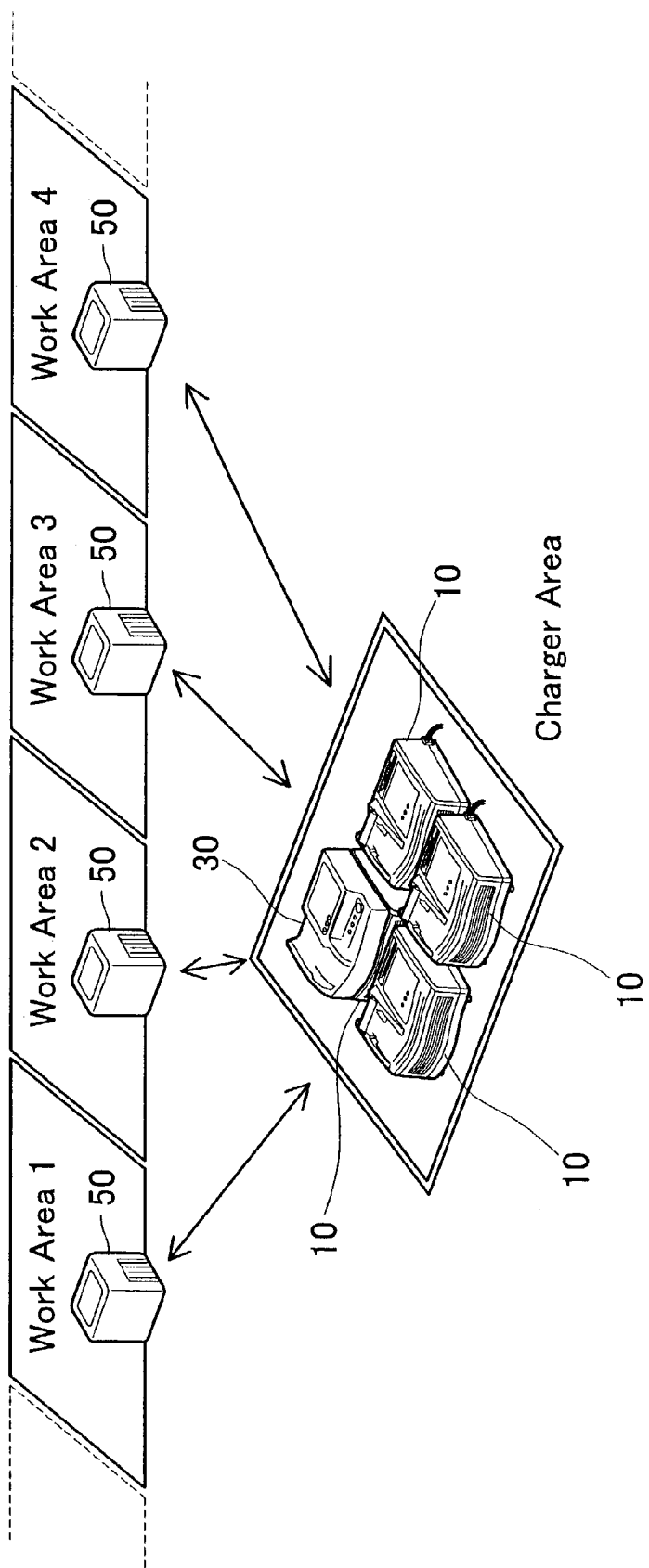
FIG. 13 schematically shows a first example of usage of the charger and adapter of the representative embodiment.
Figure 14:
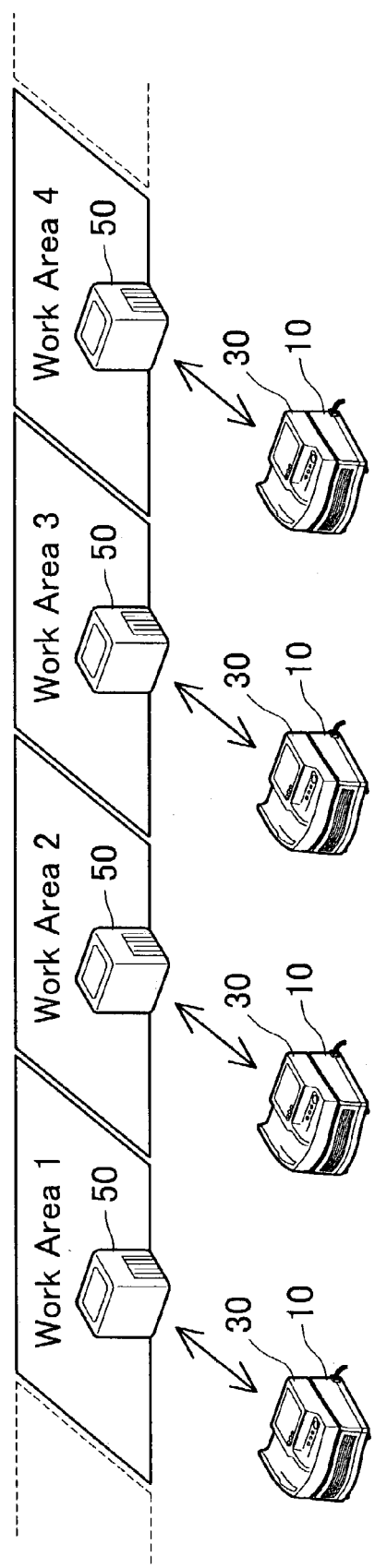
FIG. 14 schematically shows a second example of usage of the charger and adapter of the representative embodiment.

The above described battery charger 10 and adapter 30 may be capable of having the aspects shown in FIGS. 13 and 14. In the example of usage shown in FIG. 13, four battery packs 50, which are used in a plurality of work areas (1–4), may be charged in one charger area. Four chargers 10 may, for example, be provided in the charger area. Adapter 30 is attached to one of the four chargers 10 provided in the charger area. In this case, four battery packs 50 are attached at random to either chargers 10 or adapter 30. Consequently, it is probable that each battery pack 50 will be attached to adapter 30 twice or more during half a refresh cycle (e.g., 16 charges). This eliminates the problem of battery pack 50 not being attached to adapter 30, and therefore not undergoing the refresh process.

Moreover, battery charger 10 and adapter 30 may naturally also be used according to the aspect shown in FIG. 14. In FIG. 14, one charger 10 and one adapter 30 is provided in each work area (1–4).

As is clear from the above description, control portion 41 of adapter 30 utilizes the total number of charges and the refresh timing flag stored in EEPROM 61 in order to determine whether battery pack 50 requires the refresh process. If the refresh process is required, it is automatically performed by control portion of adapter 30. Consequently, the refresh process can be performed automatically on batteries 58 of battery pack 50.

Furthermore, as is made clear in FIG. 9, when the refresh process has been performed in the former half of the refresh cycle, the refresh process is not performed in the latter half of the refresh cycle that immediately follows. Similarly, when the refresh process has been performed in the latter half of the refresh cycle, the refresh process is not performed in the former half of the refresh cycle that immediately follows. As a result, the refresh process is not performed an excessive number of times on batteries 58 of battery pack 50, thus preventing the life of batteries 58 from being shortened.

While a preferred embodiment of the present teaching has been described, such description is for illustrative purposes only, and it is to be understood by those skilled in art that changes and variations may be made.

For example, in the above illustrated representative embodiment, the standard refresh process (i.e., discharging process) is performed twice in the former half or the latter half of the refresh cycle. However, the present teachings is not restricted to this configuration: the discharging process may equally well be performed only once in the former half or the latter half of the refresh cycle. That is, the frequency of the discharging process can be adjusted by setting an appropriate number of refresh cycles, so that the memory effects can be eliminated through one discharging process when appropriate.

FIG. 15 shows the representative example of numerical values of the refresh timing flag, and the states corresponding to these numerical values, in a case wherein the refresh process is performed only once in the former half or the latter half of the refresh cycle. Since the refresh process may need to be performed only once in the former half or the latter half of the refresh cycle, the refresh timing flag may have six possible values (e.g., [1], [2], [3], [5], [6], [7], as shown in FIG. 15).

Figure 16:
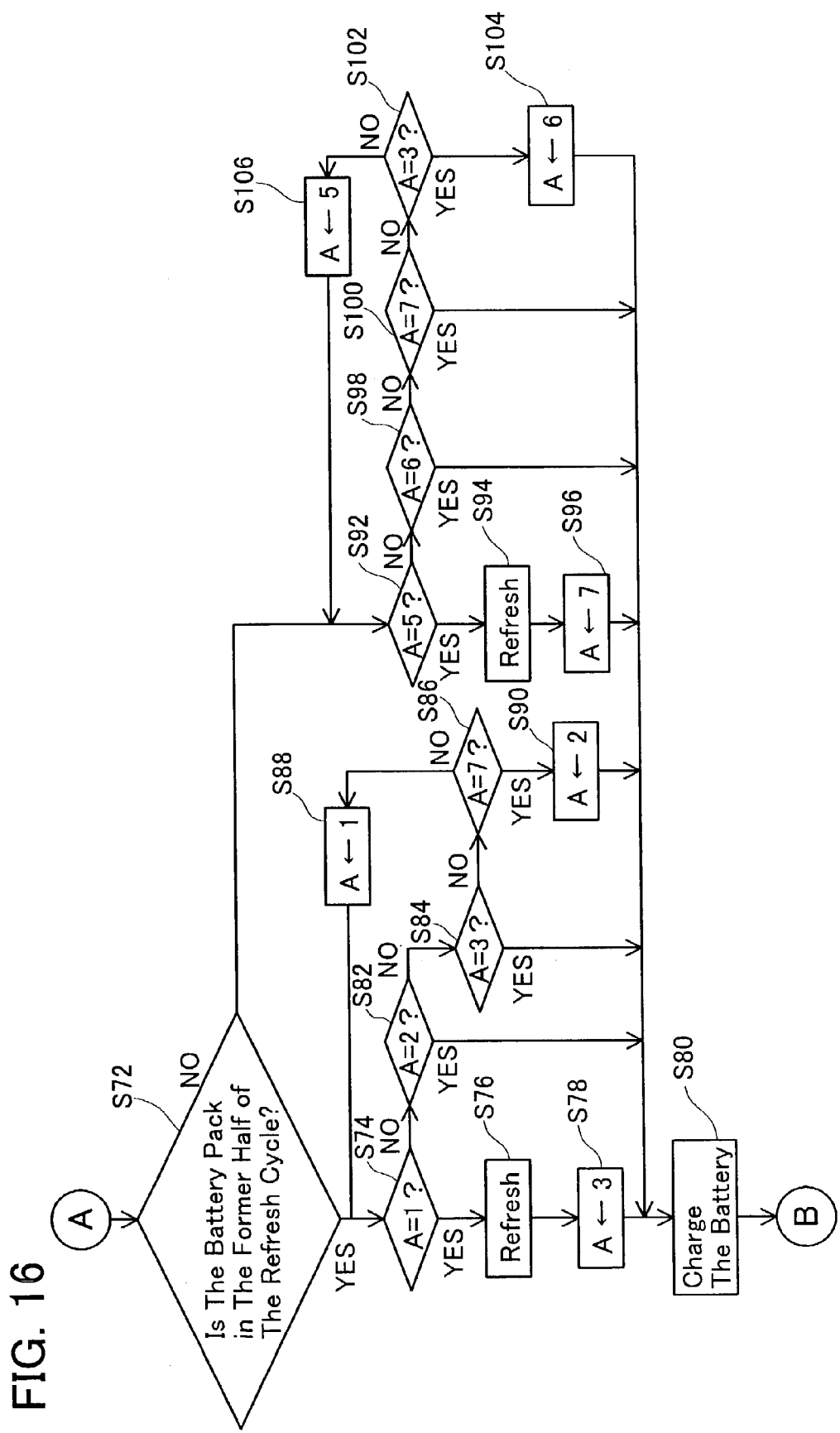
FIG. 16 is a flowchart that shows process steps performed by a control portion of an adapter of the representative embodiment of FIG. 13.

FIG. 16 shows the flowchart of the representative process executed by the control portion of the adapter in the case where the refresh process is performed only once in the former half or the latter half of the refresh cycle. In FIG. 16, only the portion corresponding to the processes of steps S16–S58 in FIG. 10 is shown. As is made clear in FIG. 16, the process is simpler in the case where the refresh timing flag has six possible values.

Additionally, in the above illustrated representative embodiment, the refresh cycle is divided into the former half and the latter half However, the refresh cycle may equally well be divided into three or more periods, it being determined in each of the periods whether the refresh process is required. For example, if the refresh cycle is divided into three, the refresh cycle is divided into a first period, a second period, and a third period. In the case where the refresh process is performed in the first period, the refresh process is not performed in the second period and third period that immediately follow. In this manner, the interval between refresh processes is lengthened.

In addition, a battery charger may be provided with a processor capable of communicating with the memory of the battery pack. When the battery pack is attached directly to the battery charger, the processor may read the total number of charges from the memory. If the total number of charges that is read is a multiple of a predetermined number, the processor may cause the flag of the memory to change to indicate that the refresh process is required. If, after the flag has been changed, the battery pack is attached to the battery charger with the adapter interposed therebetween, the refresh process is performed on the battery pack.

Further, a battery charger may be provided with a voltage detecting circuit for monitoring the voltage of the battery pack in addition to the processor that is capable of communicating with the memory of the battery pack. If the charge voltage detected by the voltage detecting circuit is above a first predetermined value, or if the discharge voltage is below a second predetermined value, the processor may cause the flag of the memory to change to indicate that the refresh process is required. Consequently, if the battery pack is in an inert state and the charge voltage is above the first predetermined value, or if the discharge voltage is below the second predetermined value, the flag is changed to indicate that the refresh process is required. If, after the flag has been changed, the battery pack is attached to the battery charger with the adapter interposed therebetween, the refresh process is performed on the battery pack. In this manner, the inert state of the battery can be eliminated automatically.

Finally, although the preferred representative embodiment has been described in detail, the present embodiment is for illustrative purpose only and not restrictive. It is to be understood that various changes and modifications may be made without departing from the spirit or scope of the appended claims. In addition, the additional features and aspects disclosed herein also may be utilized singularly or in combination with the above-described aspects and features.

The invention claimed is:

1. An apparatus comprising:
a battery charger comprising a charging circuit for charging rechargeable batteries of a battery pack;
an adapter capable of being connected with the battery pack and the battery charger, the adapter comprising a discharging circuit for discharging the rechargeable batteries, a switch for selectively connecting the rechargeable batteries with the discharging circuit or with the charging circuit of the battery charger when the battery pack is connected with the battery charger via the adapter, and a control portion that controls the switch on the basis of a flag stored in a memory of the battery pack when the battery pack is connected with the battery charger via the adapter, wherein the flag indicates whether a refresh process is required.

2. An apparatus as in claim 1, wherein the battery pack is capable of being connected directly to the battery charger, the battery charger charging the rechargeable batteries of the battery pack when the battery pack has been directly connected to the battery charger.

3. An apparatus as in claim 1, wherein the control portion is capable of communicating with the memory of the battery pack, the control portion reading the flag from the memory to determine whether the refresh process is required.

4. An apparatus as in claim 1, wherein the memory further stores a total number of charges of the battery pack, wherein the control portion determines based upon the total number of charges and the state of the flag whether the refresh process is required.

5. An apparatus as in claim 4, wherein the flag indicates whether the refresh process is required in a first period during a former half of the preset refresh cycle, or a second period during a latter half of the preset refresh cycle, the flag indicating at least six states: (1) a first state indicating that the refresh process is required in the first period and that the refresh process has not yet been performed; (2) a second state indicating that the refresh cycle has been performed in the first period; (3) a third state indicating that the refresh process is not required in the first period; (4) a fourth state indicating that the refresh process is required in the second period and that the refresh process has not yet been performed; (5) a fifth state indicating that the refresh process has been performed in the second period; (6) a sixth state indicating that the refresh process is not required in the second period.

6. An apparatus as in claim 5, wherein the control portion performs the following: (1) if it is determined from the total number of charges that the battery pack is in the first period, and the flag indicates the first state, the fourth state, or the sixth state, the control portion causes the refresh process to be performed on the battery pack, and changes the flag to the second state after the refresh process is completed; (2) if it is determined from the total number of charges that the battery pack is in the first period, and the flag indicates the fifth state, the control portion changes the flag to the third state; (3) if it is determined from the total number of charges that the battery pack is in the second period, and the flag indicates the first state, the third state, or the fourth state, the control portion causes the refresh process to be performed on the battery pack, and changes the flag to the fifth state after the refresh process is completed; (4) if it is determined from the total number of charges that the battery pack is in the second period, and the flag indicates the second state, the control portion changes the flag to the sixth state.

7. An adapter comprising:
a first electrical contact capable of connecting with rechargeable batteries of a battery pack;
a second electrical contact capable of connecting with a charging circuit of a battery charger;
a discharging circuit for discharging the rechargeable batteries;
a switch selectively connecting the first electrical contact with either the discharging circuit or with the second electrical contact;
a control portion electrically connecting the switch and a memory of the battery pack, the memory stores a flag indicating whether the refresh process is required, wherein the control portion reads a flag from the memory and controls the switch on the basis of the read flag when the rechargeable batteries has been connected with the first electrical contact and the charging circuit has been connected with the second electrical contact.

8. An apparatus as in claim 1, wherein the control portion comprises a microprocessor.

9. An apparatus as in claim 1, wherein the control portion comprises a microcontroller.

10. An apparatus as in claim 7, wherein the control portion comprises a microprocessor.

11. An apparatus as in claim 7, wherein the control portion comprises a microcontroller.

* * * * *